Patented Feb. 6, 1945

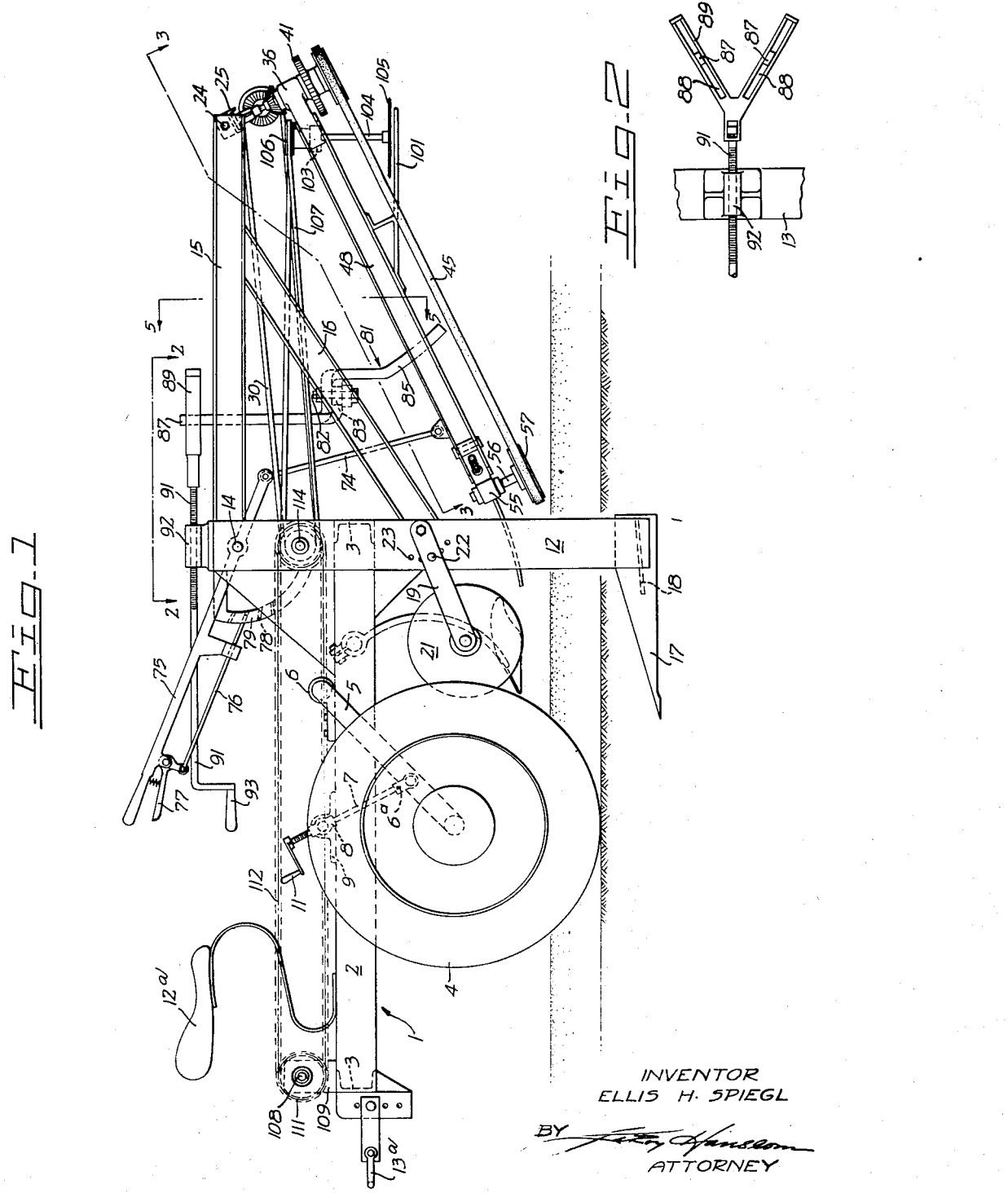

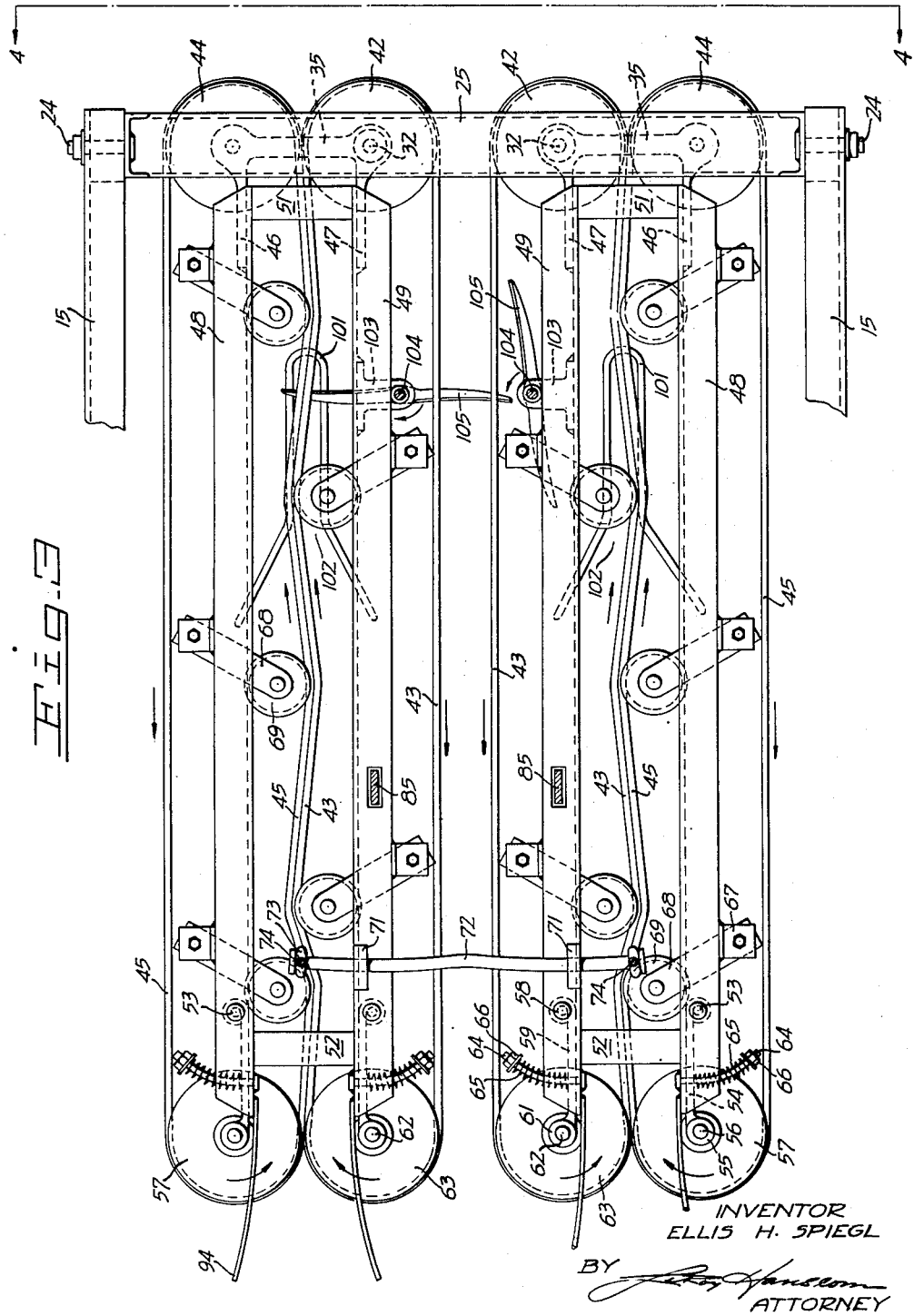

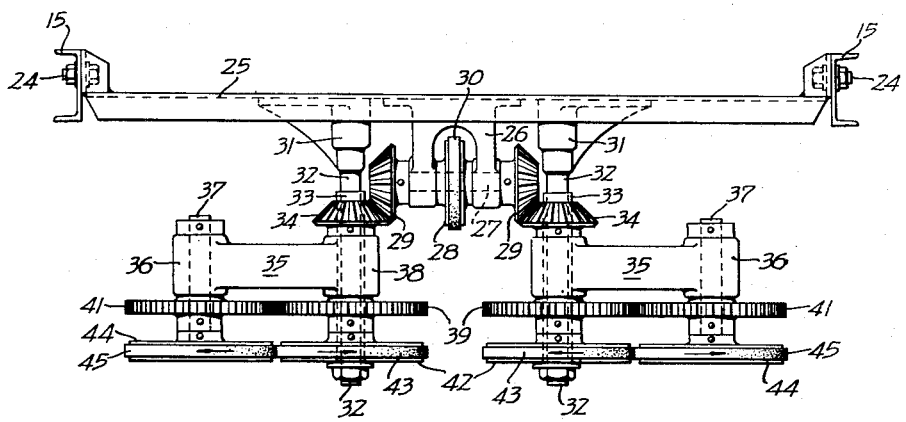
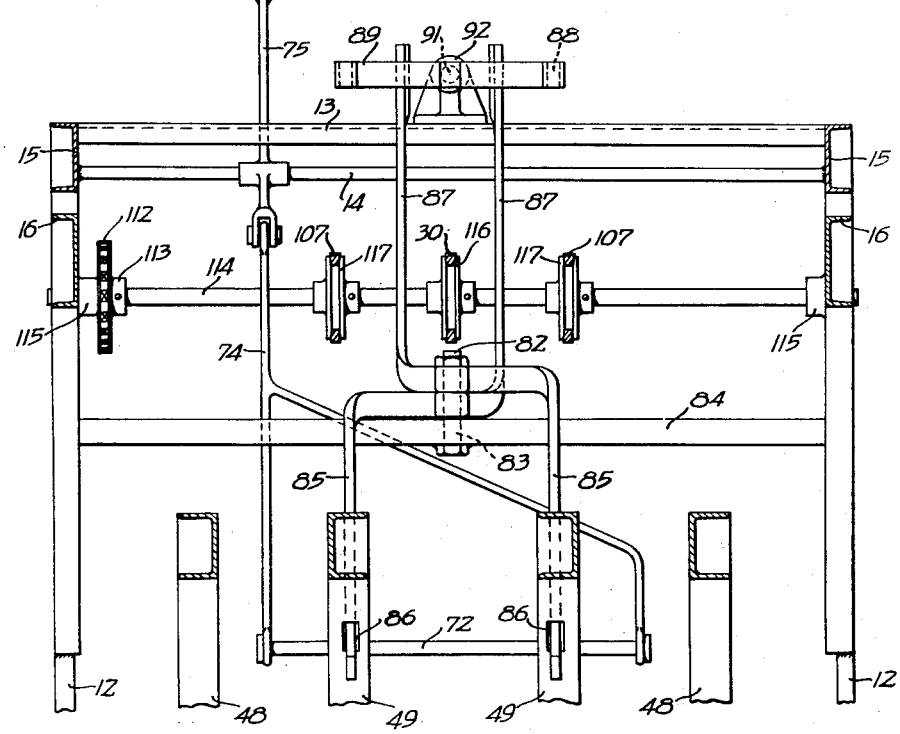

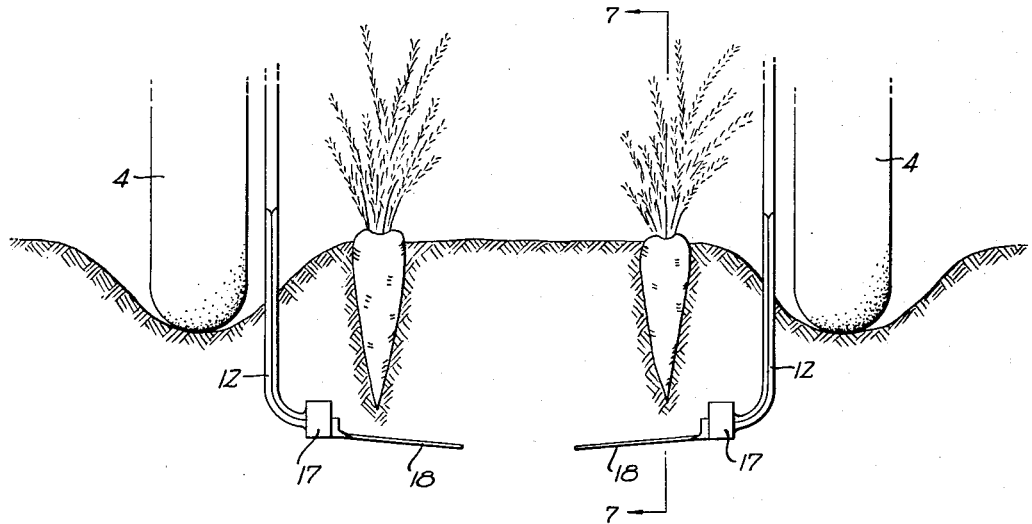
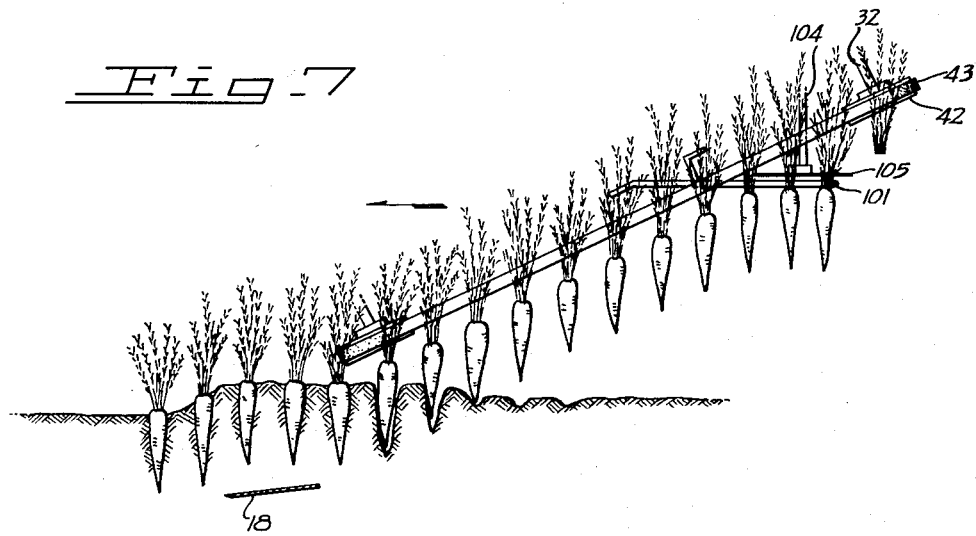

2,368,895

UNITED STATES PATENT OFFICE 2,368,895

VEGETABLE HARVESTER

Ellis H. Spiegl, Salinas, Calif.

Application June 8, 1943, Serial No. 490,095

1 Claim. (Cl. 55—108)

This invention relates to vegetable harvesters, and more particularly to a machine for mechanically harvesting and topping root and bulb vegetables such as, for example, carrots and onions.

In general, the object of this invention is the provision of a machine arranged to travel over the hills of a vegetable field, and while so doing, to progressively loosen the dirt surrounding the vegetables, successively grip the tops or greens of the vegetables between two engaging rearwardly and upwardly traveling sections of a pair of endless belts, and which uproot the vegetables and carry them to the rear of the machine, where they are automatically topped and dropped on an endless conveyor.

Another object of the invention is the provision in a harvester, of the character above defined, of means for effecting vertical and lateral adjustments of the pick-up belts with respect to the frame of the machine, so as to compensate for variations in the height of the hills, and in the location of the vegetables in the hills.

The invention possesses other advantageous features, some of which with the foregoing will be set forth at length in the following description where that form of the invention which has been selected for illustration in the drawings accompanying and forming a part of the present specification is outlined in full. In said drawings, one form of the invention is shown, but it is to be understood that it is not limited to such form, since the invention as set forth in the claim may be embodied in a plurality of forms.

Referring to the drawings;

Figure 1 is a side elevation of a vegetable harvester embodying the objects of my invention.

Figure 2 is a fragmentary top elevation viewed in the plane indicated by the line 2—2 of Figure 1.

Figure 3 is an enlarged section of the pick-up belts and supporting frame shown in Figure 1 and taken on the plane indicated by the section line 3—3 of Figure 1.

Figure 4 is a rear end elevation of the pick-up belts and supporting frame as viewed in the plane indicated by the line 4—4 of Figure 3.

Figure 5 is a vertical section taken on the plane indicated by the section line 5—5 of Figure 1.

Figure 6 is a fragmentary section taken through a carrot field showing my harvester straddling one hill, and two rows of carrots with the plows of the machine passing beneath the carrots.

Figure 7 is a diagrammatic longitudinal section of my harvester, illustrating the basic operating elements of my machine, such as the plows, the pick-up belts, the topping knife and the endless conveyor.

To obtain a general appreciation of the fundamental operating elements of my device and their co-action, reference should first be had to Figure 7, where these elements are shown traveling from right to left in their proper relation with respect to a row or hill of carrots. The leading element shown is an under-cutting blade 18 which advances beneath the carrots, and in so doing, breaks up the surrounding ground, and effects a slight undulation thereof. The next element is an endless pick-up belt 43, the forward end of which, together with the forward end of a companion belt not shown in this figure, engages successively each carrot top at a point substantially over the crest of the forwardly moving wave or undulation of dirt caused by the under-cutting blade 18, and before each carrot and its surrounding dirt have had a chance to drop back into their original positions.

To avoid grabbing of the carrot tops by the pick-up belts, the engaging sections of the two belts are made to travel rearwardly at substantially the same speed that the machine as a unit is traveling forwardly. The carrots then are merely elevated with substantially no forward or rearward movement with respect to the ground. Although carrot tops are rather tender, they can easily withstand the slight tension to which they are here subjected in being uprooted without danger of severing them from their roots (carrots proper).

Located in the path of the carrots carried by the pick-up belts, at a point intermediate the ends of the two belts, is an elongated U-shaped deflector or guide member 101, against the lower face of which the tops of the carrots slide. Disposed just above the rearward end of the deflector is a topping knife 105 rotating in the path of the on-coming carrot greens. Since the carrots are guided along the deflector, and since the topping knife is located at a pre-determined distance above the deflector, the greens are always cut off at a pre-determined distance from the carrots. The contact between the engaging sections of the pick-up belts is such that as the carrots slide along the deflector, the greens slide downwardly between the two engaging belt sections. Finally, as the carrots are topped, they fall on a transverse endless conveyor 121, which can be used either to carry the topped carrots to a truck traveling adjacent the harvester, or when onions are being harvested, for windrowing the untopped onions in adjacent furrows. For this latter purpose, the topping knife of the harvester is obviously disconnected.

As shown in detail in Figures 1, 2, 3, 4, 5, 7, the above principles have been embodied in a harvester provided with twin pick-up units arranged to operate on twin rows of vegetables growing in a single hill, and which comprises a truck generally designated by the reference numeral 1, and formed by a welded rectangular frame made up of side channels 2, and front and rear channels 3, supported on either side by wheels 4. The wheels 4 are independently mounted on separate offset axles 5 journaled on bearings 6, bolted to the side channels 2. Pivoted to the offset of each of the axles 5 is a fitting 6ᵃ, in which is swiveled a screw 7, having threaded engagement with a sleeve 8. The sleeve is in turn pivoted to a block 9, secured to one of the side channels 2, the upper end of the screw being provided with a crank 11 for adjusting the height of its associated wheel independently of the position of its opposed wheel. Secured to the forward end of the truck frame is a rearwardly facing, spring mounted, operator's seat 12ᵃ. Also fastened to the forward end of the truck frame is a link or hitch 13ᵃ for connecting the truck to a suitable draft vehicle. The truck so far disclosed may be of any standard construction, such as, for example, the Killefer combination unit, Model 450, manufactured by the Killefer Manufacturing Corporation, of Los Angeles, California.

Welded to the rear of the frame 1 is a pair of upright side plates 12, interconnected at their upper ends by an angle bar 13, and by a rod 14. Extending rearwardly of and welded to each of the opposed side plates 12 is a substantially horizontal channel 15. Welded to each of the channels 15 and the side plates 12 is a channel-shaped strut 16. To the foot of each of the side plates 12 is secured a forwardly extending downwardly inclined plow 17, and an inwardly extending and forwardly inclined undercutting blade 18 (see Figure 6). Pivoted to each of the side plates 12 intermediate its ends is a forwardly extending link 19, to the outer end of which is journaled a rotatable weed cutting disc 21. The depth of the disc 21 may be adjusted at will by a pin 22 carried by the link 19, and insertable in any one of a number of holes 23 formed in the side plate 12.

Journaled to the rearward free ends of the channels 15 by means of pins 24 and extending therebetween is a pick-up belt suspension channel 25. Bolted to the center of the channel 25 is a depending bifurcated bearing 26, in which is journaled a shaft 27. Keyed to the shaft 27 between the forks of the bearing 26 is a belt pulley 28 and keyed to each end of the shaft 27 is a bevel gear 29. Extending over the belt pulley 28 is a drive belt 30. Bolted to the channel 25 on either side of the bearing 26 is a bracket 31, and fixed to each of the brackets 31 is a depending pin 32.

Journaled on each of the pins 32 is a sleeve 33 to which is keyed a bevel gear 34 arranged to mesh with one of the bevel gears 29. Journaled on each of the sleeves 33 immediately below the bevel gear 34 is an arm 35 formed at its outer end with a bearing 36 for the reception of a pin 37. Fixed to the sleeve 33 beneath the bearing 38 formed on the inner end of the arm 35 is a gear 39 arranged to mesh with and drive a complementary gear 41 fixed to the pin 37. Secured to the lower end of the sleeve 33 and keyed thereto is a belt pulley 42 passing over which is a pick-up belt 43. Similarly keyed to the pin 37 is a belt pulley 44, over which is disposed a pick-up belt 45 opposed to the belt 43, and which as best shown in Figure 3 engages the inner rearwardly traveling section of the pick-up belt 43.

By the mechanism above described, each of the pick-up belts 43 and 45 of the two identical units are driven by the central belt 30. Each unit is free to swing about its pin 32, and both units are free to rotate together about the common axis of the pins 24.

As best shown in Figure 3, each of the arms 35 is provided with a pair of straps 46 and 47 extending forwardly thereof, and formed integral therewith. Bolted to each of the straps 46 and 47 respectively are forwardly extending channels 48 and 49. Welded between and to the rear ends and forward ends of channels 48 and 49 are respectively rear cross members 51 and forward cross members 52. The channels 48 and 49 and cross members 51 and 52 therefore constitute a pair of similar and opposed belt pick-up frames arranged to swing together about the axis of the pins 24, and swing individually about the axes of the pins 32.

Each of the channels 48 carries near its inner end a pin 53, to which is fixed a strap 54. Provided at the free end of each of the straps 54 is a bearing 55 for the reception of a pin 56. Keyed to the lower end of the pin 56 is a belt pulley 57, over which the belt 45 is made to pass. Similarly each of the channels 49 is provided near its inner end with a pin 58 arranged to carry a strap 59, the outer end of each of the straps 59 being provided with a bearing 61, for the reception of a pin 62. Secured to the lower end of the pin 62 is a belt pulley 63, over which is made to pass the belt 43. Welded to the inner ends of each of the channels 48 and 49 is an outwardly extending curved bolt 64, surrounded by a coil spring 65, the compression of the coil spring 65 being adjusted by means of a nut 66 carried on the end of the curved bolt. The bolts 64 are so curved that they lie on the sector of a circle, having the pins 53 and 58 as centers. This construction thereby permits the opposed belt pulleys 57 and 63 to diverge away from each other against the action of the springs 65, in order to accommodate any solid matter which may enter between the belts 43 and 45.

Welded along the length of each of the channels 48 and 49 are spaced brackets 67, to each of which is pivoted an arm 68, provided at its free end with a belt tensioning pulley 69, serving to hold the rearwardly traveling sections of the belts 43 and 45 in positive engagement with each other throughout substantially the entire length of the belt pick-up units.

Secured to the upper faces of the opposed channels 49 adjacent their rear ends, are lugs 71 formed with aligned apertures for the reception of a rod 72 curved from its central point to each of its ends, so as to lie on a sector of a curve having the axis of the pin 32 as a center. The ends of the rod 72 are threaded through eyes 73 formed in the lower ends of the legs of a suspension yoke 74. Pivoted on the rod 14 is an operating lever 75, the inner end of which is linked to the upper end of the yoke 74, the free end of the lever serving as a means for permitting an operator seated on seat 12a to vary the level of the lower ends of the pick-up belts. To lock the pick-up belts in any vertically adjusted position, a rod 76 linked to a spring pressed lever 77 is engaged in any one of a number of holes 78 formed in arc 79 carried by the truck frame.

For the purpose of maintaining the lower forward ends of the belt pick-up units in lateral alignment with the twin rows of vegetables, offset tongs 81 are mounted on a cross member 84, welded at its ends to the struts 16. Fastened to the cross member 84 is a socket 83, and journaled therein is a pin 82 on which the tongs 81 are pivoted. The lower arms 85 of the tongs 81 pass through slots 86 formed in the channels 49, and the upper arms 87 extend upwardly through slots 88 formed in a V-shaped spreader 89. The V-shaped spreader 89 is swiveled on the forward end of a screw 91, having threaded engagement with a sleeve 92, secured to the upper face of the angle 13. Formed on the forward end of the screw 91 is a crank 93, by which the V-shaped spreader 89 may be advanced or retarded respectively to spread or bring together the upper arms 87 of the tongs 81. Spreading the upper arms 87 of the tongs 81 will, of course, spread its lower arms 85, and consequently increase the distance between the two pick-up units. Conversely bringing the upper arms 87 of the tongs 81 together, will decrease the distance between the two pick-up units.

By the mechanism above described, the operator can maintain the twin pick-up units in both vertical and lateral alignment with the two rows of carrots growing in each hill. In this connection, it is also to be observed that a further vertical adjustment of the machine in its entirety may be effected by the cranks 11 operating separately on the axle with which each crank is associated.

Welded to each pair of channels 48 and 49 intermediate their ends and extending rearwardly thereof in substantially a horizontal plane is an elongated U-shaped deflector or guide member 101, having a V-shaped opening 102. Journaled in a sleeve 103 mounted on each of the channels 49 is a shaft 104 provided at its lower end with a topping knife 105, arranged to sweep over the elongated U-shaped deflector 101. To the upper end of each of the shafts 104 is keyed a belt pulley 106 driven by a belt 107.

The mechanism for driving the belt 30 of the belt pick-up units and the belts 107 for operating the topping knives 105, comprise a shaft 108 journaled in upstanding brackets 109 secured to the rear of the truck frame 1. The shaft 108 may be driven from the draft vehicle pulling the harvester in any suitable manner, such as by a flexible cable geared at its forward end to a drive carried by the draft vehicle, and geared at its rear end to the shaft 108. Also keyed to the shaft 108 is a sprocket wheel 111, which drives a chain 112, passing over a sprocket wheel 113, secured to the shaft 114. The shaft 114 is journaled at either end in bearings 115 carried by the opposed plates 12. Keyed centrally on the shaft 114 is a belt pulley 116, over which passes the belt 30 driving the belt pulley 28. Also keyed to the shaft 114 on either side of the belt pulley 116 are belt pulleys 117, over which pass the belts 107 associated with the belt pulleys 106.

Although the operation of the harvester above described, has already been generally described with reference to Figure 7, it should be particularly noted that the pick-up belts 43 and 45 should be driven at such a speed that the engaging sections of these belts travel rearwardly in relation to the harvester at substantially the same speed that the harvester is moving forwardly with relation to the ground. By driving the pick-up belts at this speed, each carrot as it is gripped between the engaging belt sections has substantially no horizontal movement with respect to the ground, but is simply elevated vertically until the upper end of the carrot engages the lower surfaces of the elongated U-shaped deflectors 101. At this level, each carrot simply slides along its deflector to the rear end thereof, and simultaneously its top or greens slide downwardly against the gripping action of the pick-up belts. Upon passing beneath the topping knife 105, the tops are severed from the carrot. Although the harvester as above described has been particularly designed for operation on twin rows of vegetables, such as carrots and onions, obviously the machine may be made to operate just as well on a single row.

I claim:

A vegetable harvester comprising: a carriage adapted to travel over a row of vegetables to be harvested; a main frame secured to said carriage provided with a pair of depending legs and rearwardly extending arms; a cross member extending between and journaled on said arms; a pick-up belt sub-frame journaled on said cross member and extending forwardly and downwardly therefrom; a pair of laterally spaced pulleys journaled on each end of said sub-frame; a pair of pick-up belts passing over said pulleys longitudinally of said sub-frame, and in contact with each other; means for so driving each of said belts that their contacting portions travel rearwardly with respect to said main frame; means for maintaining the lower forward end of said sub-frame at any desired elevation with respect to said main frame; means for adjusting at will the lateral position of the lower end of said sub-frame; and a blade secured to each of said depending legs in approximate vertical alignment with the converging portions of said belts, and arranged to pass beneath said vegetables for the purpose of breaking up the ground surrounding their roots, and for slightly elevating them just prior to the time that said belts converge upon and grip their greens.

ELLIS H. SPIEGL.